US006965474B2

(12) United States Patent
Johnson et al.

(10) Patent No.: US 6,965,474 B2
(45) **Date of Patent: *Nov. 15, 2005**

(54) POLYMERIC OPTICAL FILM

(75) Inventors: Matthew B. Johnson, St. Paul, MN (US); Richard C. Allen, Lilydale, MN (US); Fred J. Roska, Woodbury, MN (US); Steven J. Rhyner, St. Paul, MN (US); William W. Merrill, White Bear Lake, MN (US); Joan M. Strobel, Maplewood, MN (US); Kevin M. Hamer, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 132 days.

This patent is subject to a terminal disclaimer.

(21) Appl. No.: 10/365,250

(22) Filed: Feb. 12, 2003

(65) Prior Publication Data

US 2004/0156106 A1 Aug. 12, 2004

(51) Int. Cl.[7] .......................... G02B 27/28; G02B 5/30

(52) U.S. Cl. ......................... 359/500; 359/494; 349/96; 349/117

(58) Field of Search ................................ 359/494, 499, 359/500; 264/2.7, 290.2; 349/96, 117, 122; 428/1.1, 1.25, 412

(56) References Cited

U.S. PATENT DOCUMENTS

| | | | |
|---|---|---|---|
| 2,618,012 | A | 11/1952 | Milne |
| 2,961,711 | A | 11/1960 | Diedrich et al. |
| 3,014,234 | A | 12/1961 | Koppehele |
| 3,046,599 | A | 7/1962 | Nicholas et al. |
| 3,057,835 | A | 10/1962 | Coover |
| 3,231,642 | A | 1/1966 | Goldman et al. |
| 3,241,662 | A | 3/1966 | Robinson et al. |
| 3,296,351 | A | 1/1967 | Rasmussen |
| 3,324,218 | A | 6/1967 | Gebler et al. |
| 3,372,049 | A | 3/1968 | Schaffhausen |
| 3,491,877 | A | 1/1970 | Anderson et al. |
| 3,502,766 | A | 3/1970 | Tsuruta et al. |
| 3,510,552 | A | 5/1970 | Tsuruta et al. |
| 3,705,283 | A | 12/1972 | Hosokawa et al. |
| 3,816,584 | A | 6/1974 | Schmidt |
| 3,853,598 | A | 12/1974 | Raguse |
| 3,887,745 | A | 6/1975 | Yoshii et al. |
| 3,890,421 | A | 6/1975 | Habozit |
| 3,903,234 | A | 9/1975 | Ikeda et al. |
| 3,952,073 | A | 4/1976 | Isaka et al. |
| 3,995,007 | A | 11/1976 | Nakamura et al. |
| 4,045,515 | A | 8/1977 | Isaka et al. |
| 4,076,532 | A | 2/1978 | Gottermeier |
| 4,134,957 | A | 1/1979 | Yoshimura et al. |
| 4,137,362 | A | 1/1979 | Miki et al. |
| 4,138,459 | A | 2/1979 | Brazinsky et al. |
| 4,139,669 | A | 2/1979 | Chang |
| 4,173,676 | A | 11/1979 | Asakura et al. |
| 4,185,148 | A | 1/1980 | Sato et al. |
| 4,230,767 | A | 10/1980 | Isaka et al. |
| 4,234,532 | A | 11/1980 | Motegi et al. |
| 4,283,462 | A | 8/1981 | Meyer et al. |

(Continued)

FOREIGN PATENT DOCUMENTS

| | | |
|---|---|---|
| EP | 0 079 520 | 11/1982 |
| EP | 0 149 878 | 5/1983 |

(Continued)

*Primary Examiner*—Leonidas Boutsikaris
(74) *Attorney, Agent, or Firm*—Anna A. Kobilansky

(57) ABSTRACT

An optical film includes a layer of simultaneous biaxially stretched polyolefin film that is substantially non-absorbing and non-scattering for at least one polarization state of visible light. The layer has x, y, and z orthogonal indices of refraction where at least two of the orthogonal indices of refraction are not equal. The layer has an in-plane retardance of 100 nm or less and an out-of-plane retardance of 50 nm or greater.

40 Claims, 3 Drawing Sheets

U.S. PATENT DOCUMENTS

| | | | | |
|---|---|---|---|---|
| 4,330,499 | A | | 5/1982 | von und zu Aufsess et al. |
| 4,335,069 | A | | 6/1982 | Levy |
| 4,343,852 | A | | 8/1982 | Isaka et al. |
| 4,370,291 | A | | 1/1983 | Kazama et al. |
| 4,393,115 | A | | 7/1983 | Yoshii et al. |
| 4,410,582 | A | | 10/1983 | Tsunashima et al. |
| 4,414,261 | A | | 11/1983 | Nanbu |
| 4,428,723 | A | | 1/1984 | Thiel et al. |
| 4,447,485 | A | | 5/1984 | Aritake |
| 4,451,533 | A | | 5/1984 | Wong et al. |
| 4,513,028 | A | | 4/1985 | Aritake |
| 4,514,534 | A | | 4/1985 | DiNardo |
| 4,536,441 | A | | 8/1985 | Schmeer et al. |
| 4,581,087 | A | | 4/1986 | Johnson |
| 4,595,738 | A | | 6/1986 | Hufnagel et al. |
| 4,625,372 | A | | 12/1986 | Hufnagel et al. |
| 4,652,409 | A | | 3/1987 | Leese et al. |
| 4,675,582 | A | | 6/1987 | Hommes et al. |
| 4,698,261 | A | | 10/1987 | Bothe et al. |
| 4,716,068 | A | | 12/1987 | Seifried et al. |
| 4,758,398 | A | | 7/1988 | Sparapany et al. |
| 4,825,111 | A | | 4/1989 | Hommes et al. |
| 4,853,602 | A | * | 8/1989 | Hommes et al. .............. 318/38 |
| 4,908,278 | A | | 3/1990 | Bland et al. |
| 4,968,464 | A | | 11/1990 | Kojoh et al. |
| 5,034,078 | A | | 7/1991 | Hodgson et al. |
| 5,036,262 | A | | 7/1991 | Schonbach |
| 5,051,225 | A | | 9/1991 | Hommes et al. |
| 5,064,579 | A | | 11/1991 | Kendall et al. |
| 5,072,493 | A | | 12/1991 | Hommes et al. |
| 5,073,458 | A | | 12/1991 | Hwo et al. |
| 5,077,121 | A | | 12/1991 | Harrison et al. |
| 5,091,237 | A | | 2/1992 | Schloegl et al. |
| 5,118,566 | A | | 6/1992 | Wilhelm et al. |
| 5,252,389 | A | | 10/1993 | Schmidt et al. |
| 5,292,561 | A | | 3/1994 | Peiffer et al. |
| 5,292,563 | A | | 3/1994 | Peiffer et al. |
| 5,366,796 | A | | 11/1994 | Murschall et al. |
| 5,374,482 | A | | 12/1994 | Ozari et al. |
| 5,429,785 | A | | 7/1995 | Jolliffe |
| 5,451,455 | A | | 9/1995 | Peiffer et al. |
| 5,474,730 | A | | 12/1995 | Gust et al. |
| 5,527,594 | A | | 6/1996 | Kinoshita et al. |
| 5,620,803 | A | | 4/1997 | Oyama et al. |
| 5,691,043 | A | | 11/1997 | Keller et al. |
| 5,753,172 | A | | 5/1998 | Forrest, Jr. et al. |
| 5,795,834 | A | | 8/1998 | Deeb et al. |
| 5,837,177 | A | | 11/1998 | DiNardo et al. |
| 5,880,800 | A | * | 3/1999 | Mikura et al. .............. 349/122 |
| 5,885,501 | A | | 3/1999 | Gardner et al. |
| 5,912,292 | A | | 6/1999 | Sun |
| 6,303,067 | B1 | | 10/2001 | Wong et al. |
| 6,358,457 | B1 | | 3/2002 | Wong et al. |
| 6,380,996 | B1 | | 4/2002 | Yokoyama et al. |
| 6,451,425 | B1 | | 9/2002 | Kozulla et al. |
| 6,659,615 | B2 | * | 12/2003 | Umemoto .................... 362/31 |
| 2002/0098372 | A1 | | 7/2002 | Wong et al. |
| 2002/0149725 | A1 | | 10/2002 | Hashimoto |
| 2003/0072931 | A1 | * | 4/2003 | Hebrink et al. ............. 428/212 |
| 2003/0086033 | A1 | * | 5/2003 | Sasaki et al. ................. 349/96 |
| 2003/0156235 | A1 | * | 8/2003 | Kuzuhara et al. ............. 349/96 |
| 2004/0155372 | A1 | * | 8/2004 | Allen et al. .................. 264/2.7 |
| 2004/0156000 | A1 | * | 8/2004 | Roska et al. ................ 349/117 |

FOREIGN PATENT DOCUMENTS

| | | |
|---|---|---|
| EP | 0 255 866 | 2/1988 |
| EP | 0 459 059 | 12/1991 |
| EP | 0 546 748 | 6/1993 |
| EP | 0 600 246 | 6/1994 |
| EP | 0 650 818 | 5/1995 |
| EP | 0 899 605 A2 | 3/1999 |
| EP | 1 156 349 A1 | 11/2001 |
| EP | 1 300 701 A1 | 4/2003 |
| FR | 2 317 076 | 7/1975 |
| GB | 1000361 | 8/1965 |
| GB | 2 094 221 | 9/1982 |
| JP | 02-264905 | 10/1990 |
| JP | 2001-100031 | 4/2001 |
| JP | 2002-148437 | 5/2002 |
| JP | 2002-148438 | 5/2002 |
| JP | 2002-196134 | 7/2002 |
| WO | WO 91/00799 | 1/1991 |
| WO | WO 95/33618 | 12/1995 |
| WO | WO 96/02386 | 1/1996 |
| WO | WO 98/25753 | 6/1998 |
| WO | WO 99/29794 | 6/1999 |
| WO | WO 00/29499 | 5/2000 |
| WO | WO 01/45920 | 6/2001 |
| WO | WO 01/60607 | 8/2001 |

* cited by examiner

POLYMERIC OPTICAL FILM

BACKGROUND OF THE INVENTION

Liquid crystal displays, such as for example, twisted nematic (TN), single domain vertically aligned (VA), optically compensated birefringent (OCB) liquid crystal displays and the like, have inherently narrow and non-uniform viewing angle characteristics. Such viewing angle characteristics can describe, at least in part, the optical performance of a display. Characteristics such as contrast, color, and gray scale intensity profile can vary substantially in uncompensated displays for different viewing angles. There is a desire to modify these characteristics from those of an uncompensated display to provide a desired set of characteristics as a viewer changes positions horizontally, vertically, or both and for viewers at different horizontal and vertical positions. For example, in some applications there may be a desire to make the viewing characteristics more uniform over a range of horizontal or vertical positions.

The range of viewing angles that are important can depend on the application of the liquid crystal display. For example, in some applications, a broad range of horizontal positions may be desired, but a relatively narrow range of vertical positions may be sufficient. In other applications, viewing from a narrow range of horizontal or vertical angles (or both) may be desirable. Accordingly, the desired optical compensation for non-uniform viewing angle characteristics can depend on the desired range of viewing positions.

One viewing angle characteristic is the contrast ratio between the bright state and the dark state of the liquid crystal display. The contrast ratio can be affected by a variety of factors.

Another viewing angle characteristic is the color shift of the display with changes in viewing angle. Color shift refers to the change in the color coordinates (e.g., the color coordinates based on the CIE 1931 standard) of the light from the display as viewing angle is altered. Color shift can be measured by taking the difference in the chromaticity color coordinates (e.g., $\Delta x$ or $\Delta y$) at an angle normal to the plane containing the screen and at any non-normal viewing angle or set of viewing angles. The definition of acceptable color shift is determined by the application, but can be defined as when the absolute value of $\Delta x$ or $\Delta y$ exceeds some defined value, for example, exceeds 0.05 or 0.10. For example, it can be determined whether the color shift is acceptable for a desired set of viewing angles. Because the color shift may depend upon the voltage to any pixel or set of pixels, color shift is ideally measured at one or more pixel driving voltages.

Yet another viewing angle characteristic that can be observed is substantial non-uniform behavior of gray scale changes and even the occurrence of gray scale inversion. The non-uniform behavior occurs when the angular dependent transmission of the liquid crystal layer does not monotonically follow the voltage applied to the layer. Gray scale inversion occurs when the ratio of intensities of any two adjacent gray levels approaches a value of one, where the gray levels become indistinguishable or even invert. Typically, gray scale inversion occurs only at some viewing angles.

Compensators have been proposed to address these issues. One concept includes a compensator film made of discotic molecules. One drawback of current discotic compensators is the typical occurrence of comparatively large color shifts. Other concepts include specific combinations of birefringent layers. There is a need for new compensator structures to provide improved or desired viewing angle characteristics.

SUMMARY OF THE INVENTION

Generally, the present invention relates to polymeric optical film useful for a variety of applications including, for example, optical compensators for displays, such as liquid crystal displays, as well as the displays and other devices containing the optical compensators.

In one embodiment, an optical film includes a layer of simultaneous biaxially stretched polyolefin film that is substantially non-absorbing and non-scattering for at least one polarization state of visible light. The layer has x, y, and z orthogonal indices of refraction where at least two of the orthogonal indices of refraction are not equal. The layer has an in-plane retardance of 100 nm or less and an out-of-plane retardance of 50 nm or greater.

In a further embodiment, an optical film includes a layer of simultaneous biaxially stretched polymer film that is substantially non-absorbing and non-scattering for at least one polarization state of visible light. The layer has x, y, and z orthogonal indices of refraction where at least two of the orthogonal indices of refraction are not equal. The layer has an in-plane retardance of 100 nm or less and an out-of-plane retardance of 50 nm or greater. The layer has a length and width of at least 0.65 meter and the in-plane and out-of-plane retardance are substantially uniform across the length and width.

In another embodiment, an optical film includes a layer of simultaneous biaxially stretched polymer film that is substantially non-absorbing and non-scattering for at least one polarization state of visible light. The layer has x, y, and z orthogonal indices of refraction where at least two of the orthogonal indices of refraction are not equal. The layer has an in-plane retardance of 100 nm or less and an out-of-plane retardance of 50 nm or greater. The layer has a thickness of 5 micrometers to 200 micrometers.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
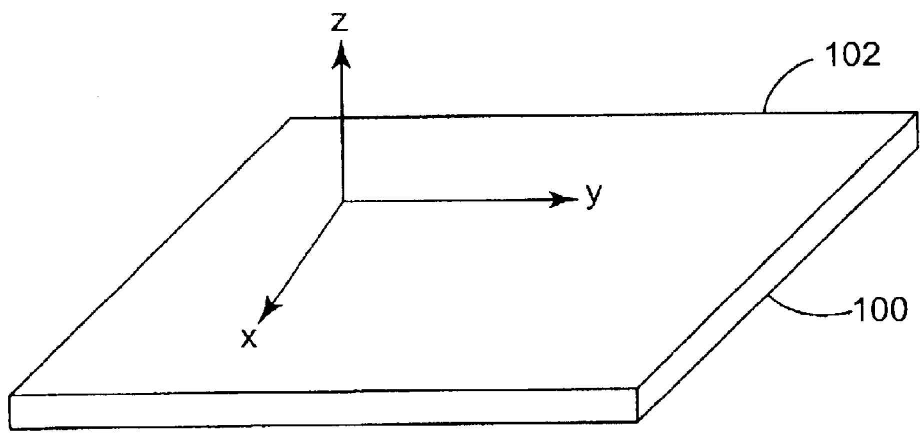
FIG. 1 is a is a schematic illustration of a coordinate system with an optical film element.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The polymeric optical film of the present invention is believed to be applicable to a variety of applications needing polymeric optical film including, for example, optical compensators for displays, such as liquid crystal displays, as well as the displays and other devices containing the optical compensators. While the present invention is not so limited, an appreciation of various aspects of the invention will be gained through a discussion of the examples provided below.

For the following defined terms, these definitions shall be applied, unless a different definition is given in the claims or elsewhere in this specification.

A "c-plate" denotes a birefringent optical element, such as, for example, a plate or film, with a principle optical axis (often referred to as the "extraordinary axis") substantially perpendicular to the selected surface of the optical element. The principle optical axis corresponds to the axis along which the birefringent optical element has an index of refraction different from the substantially uniform index of refraction along directions normal to the principle optical axis. As one example of a c-plate, using the axis system illustrated in FIG. 1, $n_x=n_y\neq n_z$, where $n_x$, $n_y$, and $n_z$ are the indices of refraction along the x, y, and z axes, respectively. The optical anisotropy is defined as $\Delta n_{zx}=n_z-n_x$.

An "o-plate" denotes a birefringent optical element, such as, for example, a plate or film, having its principle optical axis tilted with respect to the surface of the optical element.

An "a-plate" denotes a birefringent optical element, such as, for example, a plate or film, having its principle optical axis within the x-y plane of the optical element. Positively birefringent a-plates can be fabricated using, for example, uniaxially stretched films of polymers such as, for example, polyvinyl alcohol, or uniaxially aligned films of nematic positive optical anisotropy LCP materials. Negatively birefringent a-plates can be formed using uniaxially aligned films of negative optical anisotropy nematic LCP materials, including for example discotic compounds.

A "biaxial retarder" denotes a birefringent optical element, such as, for example, a plate or film, having different indices of refraction along all three axes (i.e., $n_x\neq n_y\neq n_z$). Biaxial retarders can be fabricated, for example, by biaxially orienting plastic films. Examples of biaxial retarders are discussed in U.S. Pat. No. 5,245,456, incorporated herein by reference. Examples of suitable films include films available from Sumitomo Chemical Co. (Osaka, Japan) and Nitto Denko Co. (Osaka, Japan). In-plane retardation and out-of-plane retardation are parameters used to describe a biaxial retarder. As the in-plane retardation approaches zero, then the biaxial retarder element behaves more like a c-plate. Generally, a biaxial retarder, as defined herein, has an in-plane retardation of at least 3 nm for 550 nm light. Retarders with lower in-plane retardation are considered c-plates.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "polarization" refers to plane polarization, circular polarization, elliptical polarization, or any other nonrandom polarization state in which the electric vector of the beam of light does not change direction randomly, but either maintains a constant orientation or varies in a systematic manner. In-plane polarization, the electric vector remains in a single plane, while in circular or elliptical polarization, the electric vector of the beam of light rotates in a systematic manner.

The term "biaxially stretched" refers to a film that has been stretched in two different directions, a first direction and a second direction, in the plane of the film.

The term "simultaneously biaxially stretched" refers to a film in which at least a portion of stretching in each of the two directions is performed simultaneously.

The terms "orient," "draw," and "stretch" are used interchangeably throughout this disclosure, as are the terms "oriented," "drawn," and "stretched" and the terms "orienting," "drawing," and "stretching".

The term "retardation or retardance" refers to the difference between two orthogonal indices of refraction times the thickness of the optical element.

The term "in-plane retardation" refers to the product of the difference between two orthogonal in-plane indices of refraction times the thickness of the optical element.

The term "out-of-plane retardation" refers to the product of the difference of the index of refraction along the thickness direction (z direction) of the optical element minus one in-plane index of refraction times the thickness of the optical element. Alternatively, this term refers to the product of the difference of the index of refraction along the thickness direction (z direction) of the optical element minus the average of in-plane indices of refraction times the thickness of the optical element.

The term "substantially non-absorbing" refers to the level of transmission of the optical element, being at least 80 percent transmissive to at least one polarization state of visible light, where the percent transmission is normalized to the intensity of the incident, optionally polarized light.

The term "substantially non-scattering" refers to the level of collimated or nearly collimated incident light that is transmitted through the optical element, being at least 80 percent transmissive for at least one polarization state of visible light within a cone angle of less than 30 degrees.

The term "J-retarder" refers to a film or sheet that is substantially non-absorbing and non-scattering for at least one polarization state of visible light, where at least two of the three orthogonal indices of refraction are unequal, and where the in-plane retardation is no more than 100 nm and the out-of plane retardation is at least 50 nm.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

FIG. 1 illustrates an axis system for use in describing the optical elements. Generally, for display devices, the x and y axes correspond to the width and length of the display and the z axis is typically along the thickness direction of the display. This convention will be used throughout, unless otherwise stated. In the axis system of FIG. 1, the x axis and y axis are defined to be parallel to a major surface 102 of the optical element 100 and may correspond to width and length directions of a square or rectangular surface. The z axis is perpendicular to that major surface and is typically along the thickness direction of the optical element.

A variety of materials and methods can be used to make optical film element of the invention. For example, the optical film may include a layer of simultaneous biaxially stretched polymeric film being substantially non-absorbing and non-scattering for at least one polarization state of visible light; and having x, y, and z orthogonal indices of refraction wherein at least two of the orthogonal indices of refraction are not equal, an in-plane retardance being 100 nm or less and an out-of-plane retardance being 50 nm or greater.

Any polymeric material capable of being biaxially stretched and possessing the optical properties described herein are contemplated. A partial listing of these polymers include, for example, polyolefin, polyacrylates, polyesters, polycarbonates, fluoropolymers and the like. One or more polymers can be combined to form the polymeric optical film.

Polyolefin includes for example: cyclic olefin polymers such as, for example, polystyrene, norbornene and the like; polypropylene; polyethylene; polybutylene; polypentylene; and the like. A specific polybutylene is poly(1-butene). A specific polypentylene is poly(4-methyl-1-pentene).

Polyacrylate includes, for example, acrylates, methacrylates and the like. Examples of specific polyacrylates include poly(methyl methacrylate), and poly(butyl methacrylate).

Fluoropolymer specifically includes, but is not limited to, poly(vinylidene fluoride).

The in-plane retardance of the polymeric optical film may be 100 nm or less or 0 nm to 100 nm. The in-plane retardance of the polymeric optical film may be 20 nm or less or 0 nm to 20 nm. The in-plane retardance of the polymeric optical film may be 20 nm to 50 nm. The in-plane retardance of the polymeric optical film may be 50 nm to 100 nm.

The out-of-plane retardance of the polymeric optical film may be 50 nm or greater, up to 1000 nm. The out-of-plane retardance of the polymeric optical film may be 75 nm or greater or 75 nm to 1000 nm. The out-of-plane retardance of the polymeric optical film may be 100 nm or greater or 100 nm to 1000 nm. The out-of-plane retardance of the polymeric optical film may be 150 nm or greater or 150 nm to 1000 nm.

The polymeric optical film can have a thickness (z direction) of 5 micrometers or greater. The polymeric optical film can have a thickness (z direction) of 5 micrometers to 200 micrometers or 5 micrometers to 100 micrometers. The polymeric optical film can have a thickness (z direction) of 7 micrometers to 75 micrometers. The polymeric optical film can have a thickness (z direction) of 10 micrometers to 50 micrometers.

The polymeric optical film can have a length and width of at least 0.65 meter. The polymeric optical film can have a length and width of at least 1.3 meters. The polymeric optical film can have a length and width of at least 1.5 meters. The in-plane and out-of-plane retardance is substantially uniform across the length and width of the polymeric optical film. The phrase "retardance is substantially uniform across the length and width of the polymeric optical film" refers to retardance (both in-plane and out-of-plane) changing less than 4 nm/cm, or 2 nm/cm or 1 nm/cm along the width and/or length and width of the layer of biaxially stretched polymer film. One quantitative measure of uniformity is defined as, $$\frac{\Delta_{in}^{max} - \Delta_{in}^{min}}{w}$$

where over a width of film w, $\Delta_{in}^{max}$ is the maximum in-plane retardation and $\Delta_{in}^{max}$ is the minimum in-plane retardation. Any number of additional additives may optionally be added to the polymer forming the optical film. A partial listing of additives includes, for example, stabilizers, processing aids, crystallization modifiers, tackifiers, stiffening agents, nano-particles, and the like.

Stabilizers include, for example, anti-oxidants, anti-ozone agents, anti-static agents, UV absorbers, and light stabilizers. Processing aids include, for example, lubricants, extrusion aids, blocking agents, and electrostatic pinning aids.

Crystallization modifiers include, for example, clarifying agents and nucleating agents. Crystallization modifiers aid in reducing "haze" in the biaxially stretched polymeric optical film. Crystallization modifiers can be present in any amount effective to reduce "haze", such as, for example, 10 ppm to 500000 ppm or 100 ppm to 400000 pm or 100 ppm to 350000 ppm or 250 ppm to 300000 ppm.

The range or solid cone of desired viewing angles can be manipulated depending upon the exact nature of the application. For example, in some embodiments, it is desirable to have a large solid angle of acceptable viewing. In other embodiments, it is desirable to strictly control the range of acceptable viewing (for example, for privacy purposes) to a narrower range of angles than is normally associated with an uncompensated display.

The polymeric optical film of the invention may replace cellulose triacetate (TAC) layers now present in many optical bodies. TAC may be obtained commercially from Fuji Photo (Japan). TAC films are available in a range of thickness from about 40 micrometers to over 120 micrometers. TAC is made with a solvent casting process and exhibits a nearly isotropic in-plane retardance. TAC exhibits an out-of-plane retardance from 30 nm to 120 nm.

The simultaneous biaxially stretched polymeric optical film of the invention may provide a wide range of properties that are different from TAC, such as, for example: lower dispersion of the refractive index; higher levels of out-of-plane retardation for any given thickness of the polymeric optical film of the invention verses TAC; improved moisture barrier resistance; lower manufacturing costs; environmentally friendly manufacturing; ability to easily customize the optical properties from substantially a c-plate to that of a biaxial retarder. The polymeric optical film of the invention may be thinner than TAC films with a similar or even smaller negative c-plate retardance, the overall thickness of the novel integrated stack of films, described below, can be thinner.

New techniques for manufacturing polymeric optical film have been developed. These techniques include stretching a polymer film in a first direction and stretching the polymer film in a second direction different than the first direction forming a biaxially stretched polymeric film. At least a portion of the stretching in the second direction occurs simultaneously with the stretching in the first direction. This technique forms a polymeric optical film with the properties and attributes described above.

Attempts to biaxially stretch polymeric film in a sequential manner have failed to produce ideal polymeric optical film with the properties and attributes described above. Polymeric optical film biaxially stretched in a sequential manner (i.e., stretching the film in a first machine direction (MD) followed by stretching the film in a second transverse direction (TD)) may often produce polymeric optical film with "patchy" optical properties and attributes. It has been observed that the final stretch direction imparts a greater influence on the optical properties and attributes of the biaxially stretched polymeric optical film. However, attempts to optimize this process have failed to produce polymeric optical films with the properties and attributes of the present invention.

Simultaneously biaxially stretched polymeric optical film still has some of the problems associated with sequentially biaxially stretched polymeric optical film in addition to issues unique to simultaneously biaxially stretched polymeric optical film. Simultaneously biaxially stretched polymeric optical film does not produce polymeric optical film with "patchy" optical properties and attributes. In addition, by employing a simultaneously biaxially stretching process, improvements in film dimensional stability and reduced thickness variability is realized over a sequential biaxial stretching process. The process described herein produces polymeric optical films with the properties and attributes of the present invention.

Figure 2:
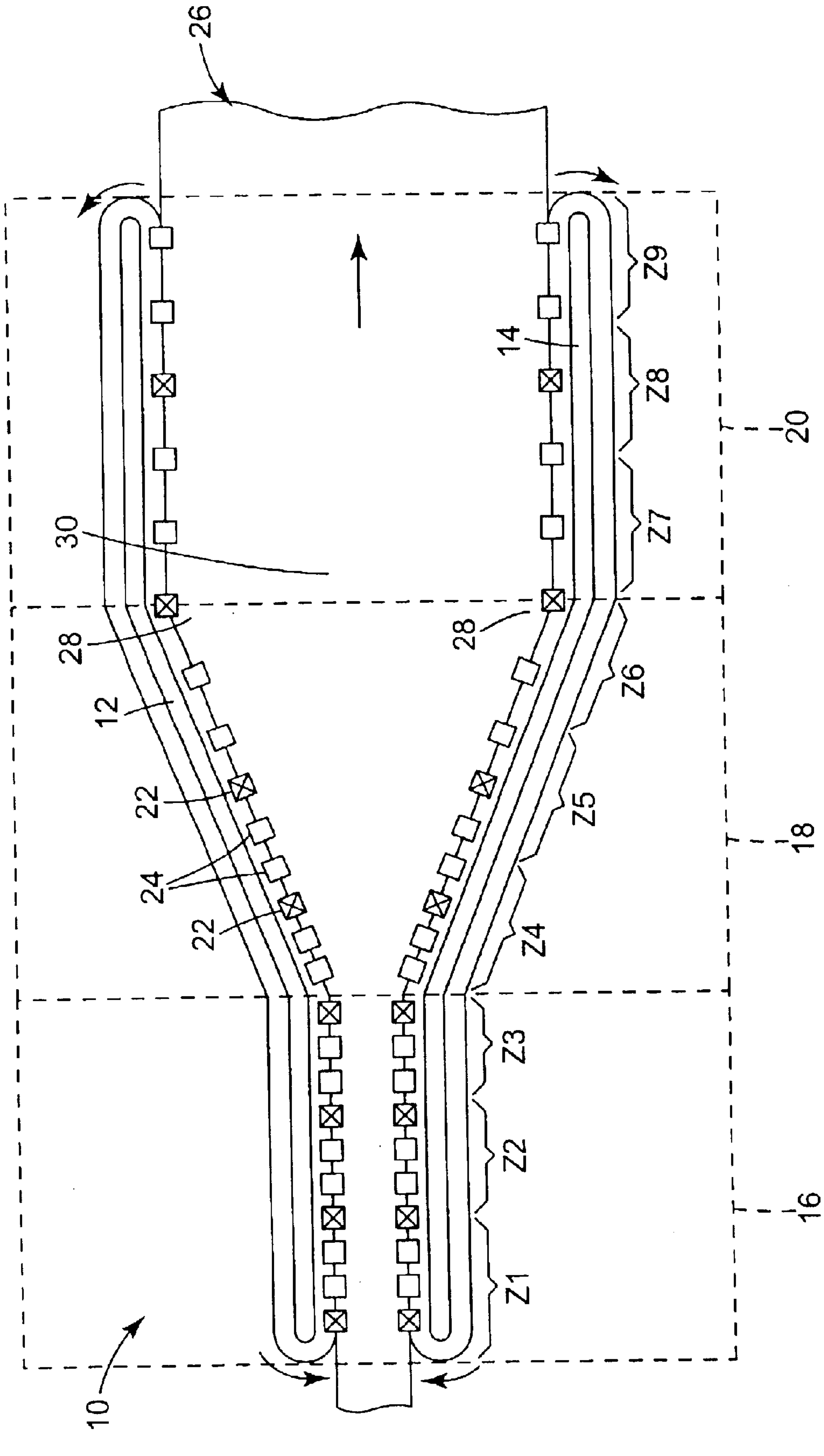
FIG. 2 is a top schematic view of a tenter apparatus for use to form the optical film element.

FIG. 2 illustrates a top schematic view of a tenter apparatus for carrying out the process of the invention. The tenter may be of the type disclosed in U.S. Pat. No. 5,051,225. Tenter apparatus 10 includes a first side rail 12 and a second side rail 14 on which the driven clips 22 and idler clips 24 ride. The driven clips 22 are illustrated schematically as boxes marked "X" while the idler clips 24 are illustrated schematically as open boxes. Between pairs of driven clips 22 on a given rail, there are one or more idler clips 24. As illustrated, there may be two idler clips 24 between each pair of clips 22 on a given rail. One set of clips 22, 24 travels in a closed loop about the first rail 12 in the direction indicated by the arrows at the ends of the rail. Similarly, another set of clips 22, 24 travels in a closed loop about the second rail 14 in the direction indicated by the arrows at the ends of the rail. The clips 22, 24 hold the film edges and propel film 26 in the direction shown by the arrow at the center of the film. At the ends of the rails 12, 14, the clips 22, 24 release the film 26. The clips then return along the outside of the rails to the entrance of the tenter to grip the cast web to propel it through the tenter. (For clarity of illustration, the clips returning to the entrance on the outside of the rails have been omitted from FIG. 2.) The stretched film 26 exiting the tenter may be wound up for later processing or use, or may be processed further.

The polymer can be cast into a sheet form to prepare a web suitable for stretching to arrive at the optical film described above. The polymer may be cast by feeding polymer resin into the feed hopper of a single screw, twin screw, cascade, or other extrusion system having an extruder barrel with temperatures adjusted to produce a stable homogeneous melt. The polymer can be extruded through a sheet die onto a rotating cooled metal casting wheel. The web is then biaxially stretched according to the process described herein. The extruded web may be quenched, reheated and fed to the clips 22, 24 on the first and second rails 12, 14 to be propelled through the tenter apparatus 10. The optional heating and the gripping by the clips 22, 24 may occur in any order or simultaneously.

The rails 12, 14 pass through three sections: preheat section 16; stretch section 18; and post-stretch treatment section 20. In the preheat section 16, the film is heated to within an appropriate temperature range to allow a significant amount of stretching without breaking. The three functional sections 16, 18, and 20 may be broken down further into zones. For example, in one embodiment of the tenter, the preheat section 16 includes zones Z1, Z2, and Z3, the stretch section 18 includes zones Z4, Z5, and Z6, and the post-stretch section 20 may include zones Z7, Z8, and Z9. It is understood that the preheat, stretch, and post-treatment sections may each include fewer or more zones than illustrated. Further, within the stretch section 18, the TD (Transverse Direction) component of stretch or the MD (Machine Direction) component of stretch may be performed in the same or in different zones. For example, MD and TD stretch each may occur in any one, two or three of the zones Z4, Z5, and Z6. Further, one component of stretch may occur before the other, or may begin before the other and overlap the other. Still further, either component of stretch may occur in more than one discrete step. For example, MD stretch may occur in Z4 and Z6 without any MD stretch occurring in Z5.

Some stretching in the MD and/or TD may also occur in the preheat section or post-stretch treatment section. For example, in the embodiment illustrated, stretching may begin in zone Z3. Stretching may continue into zone Z7 or beyond. Stretching may resume in any of the zones after zones Z3, Z5, or Z6.

The amount of stretching in the MD may be different than the amount of stretching in the TD. The amount of stretching in the MD may be up to 10% or 25% or 50% greater than the amount of stretching in the TD. The amount of stretching in the TD may be up to 10% or 25% or 50% greater than the amount of stretching in the MD. Surprisingly, this "unbalanced" stretching helps to provide the optical film with substantially uniform in-plane retardance.

The film may be propelled through the post-treatment section 20. In this section, the film 26 may be maintained at a desired temperature while no significant stretching occurs. This treatment can be referred to as a heat set or anneal, and may be performed to improve the properties of the final film, such as dimensional stability. Also, a small amount of relaxation in either or both the TD and MD may occur in the post-treatment section 20. Relaxation here refers to a convergence of the rails in the TD and/or a convergence of the driven clips on each rail in the MD, or simply the reduction of stress on the film in the TD and/or MD.

Biaxial stretching of films is sensitive to many process conditions, including but not limited to the composition of the polymer or resin, film casting and quenching parameters, the time-temperature history while preheating the film prior to stretching, the stretching temperature used, the stretch profile used, and the rates of stretching. With the benefits of the teaching herein, one of skill in the art may adjust any or all of these parameters and obtain films having the desired optical properties and characteristics.

The cooling of the biaxially stretched optical film may begin before or after the onset of stretching in the stretch section 18. The cooling can be "zone" cooling which refers to cooling substantially the entire width or TD of the web, from the edge portions 28 of the film through the center portion 30 of the film. Surprisingly, zone cooling immediately after the stretching zone has been found to improve uniformity of in-plane retardance of polymeric optical films when applied in an effective amount. Cooling may be provided by forced air convection.

In addition, application of an effective amount of zone cooling improves the cross-directional (TD) variation of in-plane retardation. As illustrated in the Examples below, by employing zone cooling immediately after the stretching zone, the cross-directional (TD) variation of in-plane retardation, as expressed previously, $$\frac{\Delta_{in}^{max} - \Delta_{in}^{min}}{w}$$

is reduced. The ability to actively control the cross-directional (TD) variation of in-plane retardation is useful when considering the practical aspects of manufacturing polymeric optical films to a sizable width (i.e. 0.65 meter or 1.3 meter or 1.5 meter) and when considering advantages gained in economy of scale and yield. The Examples below illustrate a variety of processing parameters to achieve the polymeric optical film of the present invention.

Optical compensators can be formed using a variety of different optical elements. Among these optical elements are o-plates, c-plates, a-plates, biaxial retarders, twisted o-plates, twisted a-plates, and other retarders. Information regarding o-plates, c-plates, and a-plates can be found, for example, in Yeh et al., *Optics of Liquid Crystal Displays*, John Wiley & Sons, New York (1999), U.S. Pat. Nos. 5,504,603, 5,557,434, 5,612,801, 5,619,352, 5,638,197, 5,986,733, and 5,986,734, and PCT Patent Applications Publication Nos. WO 01/20393 and WO 01/20394, all of which are incorporated herein by reference.

The optical elements are configured in combinations as described below to form optical bodies or optical compensator stacks. Optical bodies or optical compensator stacks can be formed by disposing a polarizer layer or a cholesteric liquid crystal material on the novel polymeric optical film described above.

Figure 3:
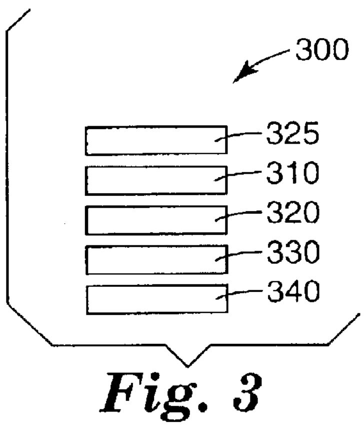
FIG. 3 is a schematic cross-sectional view of an optical compensator stack according to the present invention.

FIG. 3 shows an optical compensator stack 300 that includes a J-retarder 310 disposed on a first liquid crystal layer 320. The J-retarder 310 includes a layer of simultaneous biaxially stretched polymeric film being substantially non-absorbing and non-scattering for at least one polarization state of visible light. The J-retarder 310 has x, y, and z orthogonal indices of refraction where at least two of the orthogonal indices of refraction are not equal, an in-plane retardance being 100 nm or less and an out-of-plane retardance being 50 nm or greater.

The first liquid crystal layer 320 includes liquid crystal material. The first liquid crystal layer 320 may be an o-plate, an a-plate or the like.

FIG. 3 shows that the optical compensator stack 300 may include a second liquid crystal layer 325 disposed on the J-retarder 310 or the J-retarder 310 may be disposed between the first liquid crystal layer 320 and the second liquid crystal layer 325. The second liquid crystal layer 325 may be an o-plate, an a-plate or the like. The optical compensator stack 300 may further include a polarizer layer 330 disposed on the first liquid crystal layer 320 or the first liquid crystal layer 320 may be disposed between the polarizer layer 330 and the J-retarder 310. The polarizer layer 330 may be an absorbing polarizer or a reflecting polarizer. A reflecting polarizer layer 340 can be disposed on the absorbing polarizing layer 330 or the absorbing polarizing layer 330 can be disposed between the reflecting polarizing layer 340 and the first liquid crystal layer 320.

Figure 4:
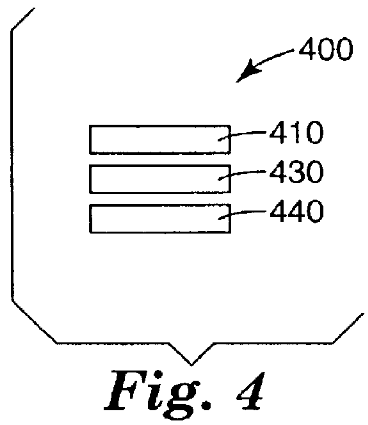
FIG. 4 is a schematic cross-sectional view of an optical compensator stack according to the present invention.

FIG. 4 shows an optical compensator stack 400 that includes a J-retarder 410 disposed on a polarizer layer 430. The J-retarder 410 includes a layer of simultaneous biaxially stretched polymeric film being substantially non-absorbing and non-scattering for at least one polarization state of visible light. The J-retarder 410 has x, y, and z orthogonal indices of refraction where at least two of the orthogonal indices of refraction are not equal, an in-plane retardance being 100 nm or less and an out-of-plane retardance being 50 nm or greater.

The optical compensator stack 400 may further include a second polarizer layer 440 disposed on the first polarizing layer 430 or the first polarizing layer 430 can be disposed between the second polarizing layer 440 and the J-retarder 410. The polarizer layer 430 may be an absorbing polarizer or a reflecting polarizer. If the first polarizing layer 430 is an absorbing polarizer, then the second polarizing layer 440 can be a reflecting polarizer layer.

Additional layers can be added to or between the optical compensation stacks layers described above. Additional optional layer include, for example, alignment layers, o-plates, a-plates and/or c-plates and the like.

One or more optical compensation stacks can be laminated to a first major face and a second major face of a LCD panel in a manner similar to that which conventional dichroic polarizers are laminated. The optical compensation stacks described above provide a wider range of retarder, for example, a biaxial retarder or c-plate, birefringence can be fabricated to make an optical compensation stack without dramatically increasing the thickness of the polarizer. With the teaching of the invention herein, it is possible to fabricate an optical compensation stack with polarizer which is thinner than a conventional polarizer not containing additional compensation film.

Display Examples

Figure 5:
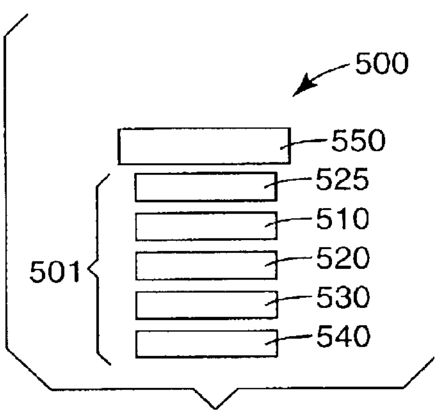
FIG. 5 is a schematic cross-sectional view of a liquid crystal display according to the present invention.

The optical bodies or optical compensators described above can be used in a variety of optical displays and other applications, including transmissive (e.g., backlit), reflective, and transflective displays. For example, FIG. 5 illustrates a schematic cross-sectional view of one illustrative display system 500 including a light modulator 550 disposed on an optical compensator stack 501 that includes a J-retarder 510 disposed on a first liquid crystal layer 520. The J-retarder 510 includes a layer of simultaneous biaxially stretched polymeric film being substantially non-absorbing and non-scattering for at least one polarization state of visible light. The J-retarder 510 has x, y, and z orthogonal indices of refraction where at least two of the orthogonal indices of refraction are not equal, an in-plane retardance being 100 nm or less and an out-of-plane retardance being 50 nm or greater. The first liquid crystal layer 520 includes liquid crystal material. The first liquid crystal layer 520 may be an o-plate, an a-plate and the like.

The optical compensator stack 501 may include a second liquid crystal layer 525 disposed on the J-retarder 510 or the J-retarder 510 can be disposed between the second liquid crystal layer 525 and the first liquid crystal layer 520. The second liquid crystal layer 525 may be an o-plate, an a-plate or the like. The optical compensator stack 501 may further include a polarizer layer 530 disposed on the first liquid crystal layer 520 or the first liquid crystal layer 520 can be disposed between the polarizer layer 530 and the J-retarder 510. The polarizer layer 530 may be an absorbing polarizer or a reflecting polarizer. A reflecting polarizer layer 540 can be disposed on the polarizing layer 530 or the polarizing layer 530 can be disposed between the reflecting polarizing layer 540 and the first liquid crystal layer 520.

Figure 6:
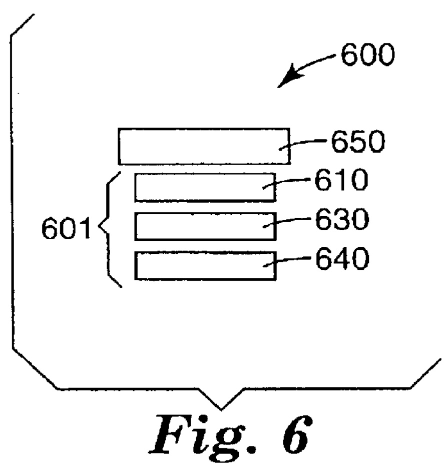
FIG. 6 is a schematic cross-sectional view of a liquid crystal display according to the present invention.

FIG. 6 illustrates a schematic cross-sectional view of one illustrative display system 600 including a light modulator 650 disposed on an optical compensator stack 601 that includes a J-retarder 610 disposed on a polarizer layer 630. The J-retarder 610 includes a layer of simultaneous biaxially stretched polymer film being substantially non-absorbing and non-scattering for at least one polarization state of visible light. The J-retarder 610 has x, y, and z orthogonal indices of refraction where at least two of the orthogonal indices of refraction are not equal, an in-plane retardance being 100 nm or less and an out-of-plane retardance being 50 nm or greater.

The optical compensator stack 601 may further include a second polarizer layer 640 disposed on the first polarizing layer 630 or the first polarizing layer 630 can be disposed between the second polarizer layer 640 and the J-retarder 610. A reflecting polarizer layer 640 can be disposed on the polarizing layer 630 or the first polarizing layer 630 can be disposed between the second polarizing layer 640 and the J-retarder 610. The polarizer layer 630 may be an absorbing polarizer or a reflecting polarizer. If the first polarizing layer 630 is an absorbing polarizer, then the second polarizing layer 640 can be a reflecting polarizer layer.

The light modulator 550, 650 that supplies the light used to view the display system 500, 600 includes, for example, a light source and a light guide, although other lighting systems can be used. Although the light modulator 550, 650 depicted in FIG. 5 and FIG. 6 has a generally rectangular cross-section, light modulators 550, 650 can use light guides with any suitable shape. For example, the light guide can be wedge-shaped, channeled, a pseudo-wedge guide, etc. The primary consideration is that the light guide be capable of receiving light from the light source and emitting that light. As a result, the light can include back reflectors (e.g., optional reflector), extraction mechanisms and other components to achieve the desired functions.

To minimize surface reflections, to enable cleaning of the front surface, to prevent scratching as well as to facilitate a number of other properties, different layers or combinations of materials can be disposed on the optical compensation stacks 501, 601. Additional films may also include touch components.

To improve brightness of a resulting display, a number of different types of films may be added to the back of the display or in to a back-light cavity. These films may include diffusers, protective shields, EMI shielding, anti-reflection films, prismatic structured films, such as BEF sold by 3M, or reflective polarizers, such as DBEF sold by 3M or Nipocs sold by Nitto Denko. When reflective polarizers operate by transmitting and reflecting circularly polarized light, such as Nipocs, additional retarder films are required, such as a quarter wave plate and the like.

FIG. 5 and FIG. 6 illustrate one optical compensation stack disposed on a light modulator, however as stated above, two optical compensation stacks can be laminated to a first major face and a second major face of a LCD panel in a manner similar to that which conventional dichroic polarizers are laminated. Thus, an LCD panel may be disposed between similar or different optical compensation stacks as described above.

It was found that the surface treatment of optical films improved the adhesion of these films to other optical films normally used in LCD's. Surface treatments include, for example, corona, flame, or plasma. Gases used in these surface treatments included oxygen, nitrogen, noble gases (such as argon and helium), chlorine, ammonia, methane, propane, and butane. Coating (e.g., chlorinated polyolefin, i.e., PVDC), chemical etching, and hydrolysis treatments can also be used to enhance the adhesive properties of the optical films.

Liquid crystal displays utilize a variety of optical films in the stack of layers comprising the display. Two examples will be provided to help explain the nature of the optical films used in displays, and how surface treatment of these films improves performance and handling.

In a first example, a polarizer comprises an oriented PVA film, which, at least in some embodiments, is stained with iodine to create the dichroism required to effectively polarize light. The oriented and stained PVA is protected from the environment by encapsulating it between two barrier films. These barrier films are often cellulose triacetate (TAC), and the material used to adhere the TAC films to the two major faces of the oriented and stained PVA is a solution including water and PVA, optionally containing methanol. Because TAC film does not wet aqueous solutions, typically the TAC film is treated with a caustic solution to hydrolyze the surfaces prior to the lamination process.

In another example, compensation films (such as WVF® available from Fuji Photo, Japan) useful in improving the viewing angle characteristics of liquid crystal displays include a number of different layers, such as a substrate, an alignment layer, an LCP layer, a polarizer (optionally with encapsulating layers), optional primer coatings and adhesives. TAC films are often used both as the encapsulating layers for the oriented and stained PVA and as the substrate for the alignment layer. In a manner similar to that described above, TAC films are often hydrolyzed in order to provide an adequate level of adhesion. A certain level of adhesion is required to assure that, should adhesive failure occur, it does so at the adhesive:glass interface, thus avoiding expensive and tedious removal of films during the optional rework process.

The present invention documents improved adhesion of optical films described herein without complex and potentially expensive primer coatings or hydrolysis treatments. It was found that a variety of surface treatments for a range of optical films improved the adhesion of said films. Novel surface treatments include, for example, corona, flame, or plasma. Gases used in these surface treatments included oxygen, nitrogen, noble gases (such as argon and helium), chlorine, ammonia, methane, propane, and butane.

The polymeric optical film described herein can be used with a variety of other components and films that enhance or provide other properties to a liquid crystal display. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, multilayer dielectric back reflectors, and holographic back reflectors.

EXAMPLES

Example A

This example illustrates a method for making simultaneously biaxially oriented polypropylene film with equal biaxial orientation.

A homopolymer polypropylene (Fina 3376, commercially available from Atofina, Deer Park, Tex.) was melt extruded and cast using conventional melt extrusion and casting equipment. The film was cast a thickness of 2250 micrometers. The film was preheated at 178 degrees Celsius with a fan speed setting of 80%. It was simultaneously oriented 7.0 times in the MD and 7.0 times in the TD at a temperature of 160 degrees Celsius. Following orientation, the film was cooled to a temperature of 135 degrees Celsius. The final film thickness was 25 micrometers.

The transmission between crossed polarizers was measured using a Perkin Elmer Lambda 900 spectophotometer, the transmission reading was 0.015%. A piece of the film was then juxtaposed to the analyzer, rotating the piece of film until the transmission was a minimum. The minimum transmission with the sample in place was 0.15%. Henceforth, the minimum transmission of a sample film between crossed polarizers will be referred to as depolarization. The polarizer was then rotated by 90 degrees at align its transmission axis parallel to that of the analyzer. The ratio of the intensity of the parallel polarizers to the intensity of crossed polarizers, henceforth known as the contrast ratio (CR), was 500:1.

Shrinkage values in both the MD and TD were measured by suspending a film in an oven at 85 degrees Celsius for 1000 hours. The results for Example A were 3% in the MD and 1% in the TD.

Creep resistance for both the TD and MD was measured at 100 degrees Celsius for 1 minute under a load of 1 lb/linear inch (180 gm/linear cm). The MD and TD creep were both 3.6%.

An in-plane retardance was measured using a National Instruments RPA2000. The in-plane retardance ($\Delta_{in}$) was 20 nm. The in-plane and out-of-plane indices of refraction was measured using a Metricon Model 2010 Prisim Coupler. The out-of-plane retardance ($\Delta_{out}$) is the product of the thickness times the difference between the average refractive index in the thickness direction (z direction) and the average refractive index in the plane of the film. Example A had an $|\Delta_{out}|$ of 265 nm.

Example 1

Example 1 illustrates a process for making an unbalanced simultaneously biaxially oriented polypropylene film with unequal biaxial orientation that shows improved thermal stability and a lower $\Delta_{in}$.

A film was made in a manner similar to that described in Example A, with the exception that the cast web was 1000 micrometers thick. The final film thickness was 15 micrometers. The temperatures in various sections of the tenter along with the MD and TD draw ratios are listed in Table 1 below.

TABLE 1

| Example | Preheat zone (° C.) | Stretch zone (° C.) | Zone Cool (° C.) | Anneal zone (° C.) | MD Draw ratio | TD Draw ratio |
|---|---|---|---|---|---|---|
| ExA | 178 | 160 | 135 | 135 | 7 | 7 |
| Ex1 | 159 | 152 | 169 | 169 | 7.5 | 8 |
| Ex2 | 159 | 152 | 140 | 169 | 7.5 | 8 |
| Ex3 | 159 | 152 | 135 | 169 | 7.5 | 8 |
| Ex4 | 159 | 152 | 135 | 169 | 7.5 | 8 |
| Ex5 | 159 | 152 | 135 | 169 | 7.5 | 8 |
| Ex6 | 178 | 160 | 130 | 135 | 7.35 | 7 |

Other properties of Example 1 are shown in Table 2.

TABLE 2

| | | | | % Shrink | | % creep resistance | | $\lvert\Delta_{in}\rvert$ | $\lvert\Delta_{out}\rvert$ |
|---|---|---|---|---|---|---|---|---|---|
| Example | $\frac{\Delta_{in}^{max}-\Delta_{in}^{min}}{w}$ (nm/m) | Depolarization (%) | CR | MD | TD | MD | TD | (nm) | (nm) |
| ExA | — | 0.15 | 500:1 | 3 | 1 | 3.6 | 3.6 | 20 | 265 |
| Ex1 | 23 | 0.15 | 500:1 | 1 | 0.5 | — | — | 30 | 165 |
| Ex2 | 15 | 0.05 | 1540:1 | 1 | 0.5 | — | — | 10 | 180 |
| Ex3 | 12 | 0.05 | 1540:1 | 1 | 0.5 | — | — | 8 | 180 |
| Ex4 | 12 | 0.02 | 3600:1 | 1 | 0.5 | — | — | 8 | 180 |
| Ex5 | — | 0.03 | 2600:1 | — | — | — | — | — | — |
| Ex6 | — | — | — | 4 | 2 | 1.8 | — | — | — |

$\lvert\Delta_{in}\rvert$ and $\lvert\Delta_{out}\rvert$ were averaged over at least 150 cm of web along TD.

Examples 2 and 3

Examples 2 and 3 were made in a manner similar to Example 1 with the exception of those process conditions cited in Table 1. The final film thickness for both Examples was 16 micrometers.

Examples 2 and 3 demonstrate that tenter temperatures impacts $$\frac{\Delta_{in}^{max}-\Delta_{in}^{min}}{w}$$

and depolarization. Examples 2 and 3 also exhibit a higher out-of-plane retardance and significantly lower in-plane retardance.

Example 4

Example 4 illustrates the effect of adding a clarifying agent. This example was made in a manner similar to Example 3, with the exception that resin containing a clarifying agent or nucleating agent, Atofina 3289MZ was added at a concentration of 25%. The resulting concentration of clarifying or nucleating agent for Example 4 was 1000 ppm.

The addition of a clarifying agent reduced depolarization to 0.03% from 0.05% in Example 3.

Example 5

Example 5 illustrates the effect of reducing temperature in the preheat section of the tenter. This example was made in a manner similar to Example 3, with the exception that the preheat temperature was decreased by reducing the fan speed to 55%. Example 5 exhibited a reduced depolarization to 0.03% from 0.05% in Example 3.

Example 6

Example 6 illustrates a means to improve creep resistance. This example was made in a manner similar to Example 1, with the exception that the cooling and annealing temperature were slightly reduced and the orientation was unbalanced. An additional process step was added to Example 6 whereby the film was orientated in the MD by an additional 5% in the post-stretch zone. Example 6 exhibited a 50% reduction in the MD creep resistance relative to Example A.

Example 7

Examples 7–16 describe improved adhesion of optical films using surface treatment of optical films. Surface treatment may include, for example, corona, flame, and/or plasma. Gases used for these surface treatments include oxygen nitrogen, noble gases, chlorine, ammonia, methane, propane, and butane. The use of coatings, chemical etching, and hydrolysis treatments may also be used to enhance the adhesive properties of the optical films.

Example 7 is a 16 micrometer polypropylene film was made in a manner similar to Example 3 and treated using a variety of gaseous surface chemistries:

(a) Air corona at 0.15 J/$cm^2$ with a relative humidity (RH) of around 25%;

(b) Flame treatment using a laminar, premixed natural gas:air flame supported on a ribbon burner at an equivalence ratio of 0.95 (air:fuel ratio of 10.1:1), a flame power of 5300 Btu/hr-inch (611 W/cm), and a burner-to-film gap of 10 mm;

(c) $N_2$ corona at 1.0 J/$cm^2$ where all of the nitrogen corona treatments throughout the examples have an the oxygen concentration in the corona of less than 10 ppm;

(d) Control (no treatment).

Example 8

Example 8 describes a film using alternate surface treatment chemistries. In a manner similar to Example 7, a 16 micrometer film was treated with different chemistries. Examples 8(a) and 8(b) are described as atmospheric-pressure plasma treatment performed using the Plasma3-brand hardware developed by Enercon Industries of Milwaukee. Example 8(c) uses a standard corona type treatment with a different chemistry.

| | | |
|---|---|---|
| (a) | 88%/12% | $He/N_2$ at 0.5 J/$cm^2$, |
| (b) | 88%/12% | $He/N_2$ at 1.0 J/$cm^2$ |
| (c) | 99%/1% | $N_2/NH_3$ at 2.6 J/$cm^2$. |

Example 9

Example 9 describes surface-treated film with LCP coatings. Example films 7a, 7b, 7c, and 7d were coated with Staralign 2110 (available from Vantico AG, Basel, Switzerland) using MEK as the solvent to form Examples 9a, 9b, 9c and 9d. The thickness of the dried Staralign layer was 50 nm. The Staralign material was then exposed to polarized UV light using an OptoAlign (available from Elsicon, Inc., Newark, Del.) to provide a dose of 15 mJ/$cm^2$ with an incidence angle of 45 degrees.

The Staralign coated films were then scored with razors prior to laminating with an adhesive tape, which was subsequently removed. The Adhesion Tape Test was performed consistent with ASTM D3359. Where poor adhesion of the Staralign coating to the polypropylene film may exist, the tape removes the alignment material. The subsequently coated liquid crystal polymer layer would exhibit random alignment.

The samples were then coated with a 18 weight percent solids mixture in MEK comprising Paliocolor LC242 (henceforth referred to simply as LCP and available from BASF AG, Ludwigshafen, Germany) with 1.26 weight percent Darocur 1173 (available from Ciba, Basel, Switzerland). The coating was then dried at 80 degrees Celsius and cured with a UV lamp at 100 percent power in an anaerobic atmosphere.

The coated samples were viewed under crossed polarizers and evaluated specifically for regions where the Adhesion Tape Test removed alignment material. In the order of decreasing quality, the relative performance of the surface treatments was: 9c, 9b, and 9a. The control film (Example film 9d) exhibited the worst performance of any of the substrates.

Environment stability was also assessed by laminating the LCP coated polypropylene film to glass and then placing the glass in two ovens with temperatures set at 80 degrees Celsius and 60 degrees Celsius/90% RH, respectively. Failure occurred when films delaminated after exposure to temperature and humidity. In decreasing order, the relative order of performance was: 9c, 9b, 9a, and 9d.

Example 10

Example 10 describes corona-treated polypropylene film with LCP coatings. Example films 8a, 8b, and 8c were coated with Staralign 2110 and photo-aligned and subsequently coated with LCP in a manner similar to Example 9 to form Examples 10a, 10b, and 10c, respectively. The peel force between polypropylene film and LCP for Examples 10a, 10b and 10c were each around 50 oz/inch (560 g/cm) as tested in a manner consistent with ASTM D3330.

Example 11

Example 11 describes laminates of surface treated polypropylene film and oriented PVA. Surface treated films Examples 7a, 7b, 7c, and 7d were laminated to an oriented and iodine stained PVA film to form Examples 11a, 11b, 11c, and 11d, respectively.

In all cases, the oriented and stained PVA actually comprised two films, the PVA and a hydrolyzed TAC layer adhered using a solution comprising 66.5%/27.9%/5.6% MeOH/water/AIRVOL PVA Grade 205 (available from Air Products and Chemicals Inc., Allentown, Pa., USA). The designation, "oriented and stained PVA," is intended to help clarify the major face to which additional laminations are performed.

The adhesive used to laminate Examples 7a, 7b, 7c, and 7d to the oriented and stained PVA comprised a solution containing 66.5%/27.9%/5.6% MeOH/water/AIRVOL PVA Grade 205. Following lamination, all samples were autoclaved at 60 degrees Celsius for 1 hour at 1 atmosphere of pressure in an air atmosphere.

The laminate films were then environmentally aged at 65 degrees Celsius/90% RH, and the peel forces were tested in a manner consistent with ASTM D3330. The peel forces were: <0.4 oz/inch (2.9 g/cm) for Example film 11d, 15 oz/inch (170 g/cm) for Example film 11a, 20 oz/inch (225 g/cm) for Example film 11b, and 22 oz/inch (250 g/cm) for Example film 11c.

Example 12

Example 12 describes laminates of surface treated polypropylene and oriented PVA. Surface treated films Examples 8a, 8b, 8c, and 8d were laminated to an oriented and iodine stained PVA film in a manner similar to Example 11. Peel forces for all Example 12 films were found to be similar to Example film 11c.

Example 13

Example 13 describes surface treated polypropylene:oriented PVA laminated to glass. The opposite major face comprising polypropylene film of Example film 11c was $N_2$ corona treated (1.0 J/$cm^2$). The resultant surface treated film, designed 13a, was then laminated to Soken 2263, a transfer optical adhesive (available from Soken Chemical & Engineering Co., Ltd, Japan), to form Example film 13b, which was then adhered to a piece of glass to form Example film 13c.

The peel force of the Soken 2263 adhesive/glass interface of Example film 13c was measured to be 22 oz/inch (250 g/cm).

Example 14

Example 14 describes corona treatment of LCP coated polypropylene. The major face of Example film 9c comprising LCP was surface treated to form Example films 14a, 14b, and 14c. The various surface treatments were:

a. $N_2$ corona at 0.5 J/cm$^2$;

b. $N_2$ corona at 1.0 J/cm$^2$;

c. $N_2$ corona at 2.0 J/cm$^2$;

d. Control (same as Example film 11c).

Example 15

Example 15 describes corona treated "LCP coated polypropylene" laminated to PVA. Example films 14 were laminated to oriented and iodine stained PVA in a manner similar to that described in Example 11 to form Example films 15a, 15b, 15c, and 15d. Peel forces were measured. The results were <0.9 oz/inch (9.8 g/cm) of width for Example film 15d and 19 oz/inch (220 g/cm) of width for Example films 15a, 15b, and 15c.

Example 16

Example 16 describes "corona treated LCP coated polypropylene": PVA laminate adhered to glass. Example films 15a, 15b, and 15c was then laminated to glass using Soken 2263 adhesive, in a manner similar to that described in Example 13. The peel force of adhesive/glass interface was, in all cases, greater than the polypropylene/PVA interface.

It is envisioned that other optical films, such as DBEF (available from 3M, St. Paul, Minn. USA) and Nipocs (available from Nitto Denko, Japan) can be similarly surface treated and adhered to oriented and stained PVA.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. An optical film comprising:

a layer of simultaneously biaxially stretched polyolefin film comprising a crystallization modifier and being substantially non-absorbing and non-scattering for at least one polarization state of visible light and having refractive indices $n_x$, $n_y$, and $n_z$ along mutually orthogonal axes x, y, and z, respectively, wherein at least two of the refractive indices are not equal, an in-plane retardance being 100 nm or less and an out-of-plane retardance being 50 nm or greater.

2. The optical film according to claim 1, wherein the polyolefin comprises polypropylene, polyethylene, polybutylene, cyclic olefin polymer, poly(4-methyl-1-pentene), or mixtures thereof.

3. The optical film according to claim 1, wherein the polyolefin comprises polypropylene.

4. The optical film according to claim 1, wherein the in-plane retardation is less than 20 nm.

5. The optical film according to claim 1, wherein the in-plane retardation is from 20 nm to 50 nm.

6. The optical film according to claim 1, wherein the in-plane retardation is from 50 nm to 100 nm.

7. The optical film according to claim 1, wherein the out-of-plane retardation is greater than 75 nm.

8. The optical film according to claim 1, wherein the out-of-plane retardation is greater than 100 nm.

9. The optical film according to claim 1, wherein the layer has a thickness of 5 micrometers to 200 micrometers.

10. The optical film according to claim 1, wherein the layer has a length and a width of at least 0.65 meter and the in-plane and out-of-plane retardance are substantially uniform across the length and width.

11. The optical film according to claim 2, further comprising a nucleating agent.

12. The optical film according to claim 2, further comprising a tackifier.

13. A optical film comprising:

a layer of simultaneously biaxially stretched polymer film comprising a crystallization modifier and being substantially non-absorbing and non-scattering for at least one polarization state of visible light; and having refractive indices $n_x$, $n_y$, and $n_z$ along mutually orthogonal axes x, y, and z, respectively, wherein at least two of the-refractive indices are not equal, an in-plane retardance being 100 nm or less and an out-of-plane retardance being 50 nm or greater and a length and width of at least 0.65 meter and the in-plane and out-of-plane retardance are substantially uniform across the length and width.

14. The optical film according to claim 13, wherein the layer of simultaneously biaxially stretched polymer film width and length is at least 1.3 meter.

15. The optical film according to claim 13, wherein the layer of simultaneously biaxially stretched polymer film width and length is at least 1.5 meter.

16. The optical film according to claim 13, wherein the in-plane retardance changes less than 4 nm/cm along the width and length of the layer of simultaneously biaxially stretched polymer film.

17. The optical film according to claim 13, wherein the in-plane retardance changes less than 2 nm/cm along the width and length of the layer of simultaneously biaxially stretched polymer film.

18. The optical film according to claim 13, wherein the in-plane retardance changes less than 1 nm/cm along the width and length of the layer of simultaneously biaxially stretched polymer film.

19. The optical film according to claim 13, wherein the polymer comprises a polyolefin, a polyester, a polyacrylate, a fluoropolymer, or mixtures thereof.

20. The optical film according to claim 13, wherein the polymer comprises polypropylene.

21. The optical film according to claim 13, wherein the polymer comprises a polyester, a copolyester, or mixtures thereof.

22. The optical film according to claim 13, wherein the polymer comprises a polymethacrylate, a poly(vinylidene fluoride), or mixtures thereof.

23. The optical film according to claim 13, wherein the layer has a thickness of 5 micrometers to 200 micrometers.

24. The optical film according to claim 13, further comprising a nucleating agent.

25. The optical film according to claim 13, further comprising a tackifier.

26. An optical film comprising:

a layer of simultaneously biaxially stretched polymer film comprising a crystallization modifier and being substantially non-absorbing and non-scattering for at least one polarization state of visible light and having refractive indices $n_x$, $n_y$, and $n_z$ along mutually orthogonal axes x, y, and z, respectively, wherein at least o of the-refractive indices are not equal, an in-plane retardance being 100 nm or less and an out-of-plane retardance being 50 nm or greater and a thickness of 5 micrometers to 200 micrometers.

27. The optical film according to claim 26, wherein the layer of simultaneously biaxially stretched polymer film has a thickness of 7 micrometers to 75 micrometers.

28. The optical film according to claim 26, wherein the layer of simultaneously biaxially stretched polymer film has a thickness of 10 micrometers to 50 micrometers.

29. The optical film according to claim 26, wherein the polymer comprises a polyolefin, a polyester, a polyacrylate, a fluoropolymer, or mixtures thereof.

30. The optical film according to claim 26, wherein the polymer comprises polypropylene.

31. The optical film according to claim 26, wherein the polymer comprises a polyester, a copolyester, or mixtures thereof.

32. The optical film according to claim 26, wherein the polymer comprises a polymethacrylate, a poly(vinylidene fluoride), or mixtures thereof.

33. The optical film according to claim 26, further comprising a nucleating agent.

34. The optical film according to claim 26, further comprising a tackifier.

35. The optical film according to claim 26, wherein the layer has a length and a width of at least 0.65 meter and the in-plane and out-of-plane retardance are substantially uniform across the length and width.

36. The optical turn according to claim 1, wherein the layer of simultaneously biaxially stretched polymer film has a thickness of 10 micrometers to 50 micrometers.

37. The optical film according to claim 13, wherein the layer of simultaneously biaxially stretched polymer film has a thickness of 10 micrometers to 50 micrometers and an out-of-plan retardance being 75 nm or greater.

38. The optical film according to claim 26, wherein the layer of simultaneously biaxially stretched polymer film has an out-of-plane retardance being 75 nm or greater.

39. The optical film according to claim 1, 13 or 26, wherein the layer of simultaneously biaxially stretched polymer film has an out-of-plane retardance being 150 nm or greater.

40. The optical film according to claim 1, 13 or 26, wherein the layer of simultaneously biaxially stretched polymer film has a thickness of 5 micrometers to 25 micrometers.

* * * * *

UNITED STATES PATENT AND TRADEMARK OFFICE

CERTIFICATE OF CORRECTION

PATENT NO. : 6,965,474 B2
DATED : November 15, 2005
INVENTOR(S) : Allen, Richard C.

It is certified that error appears in the above-identified patent and that said Letters Patent is hereby corrected as shown below:

Column 6,
Line 7, delete "$\Delta in^{max}$" and insert -- $\Delta in^{min}$ --.

Column 18,
Line 9, delete "A" and insert -- An --.
Line 63, after "least" delete "o" and insert -- two --.

Column 20,
Line 9, delete "plan" and insert -- plane --.

Signed and Sealed this

Fourth Day of April, 2006

JON W. DUDAS
*Director of the United States Patent and Trademark Office*